F. PERSKY.
LANTERN.
APPLICATION FILED AUG. 31, 1912.
1,057,770.
Patented Apr. 1, 1913.
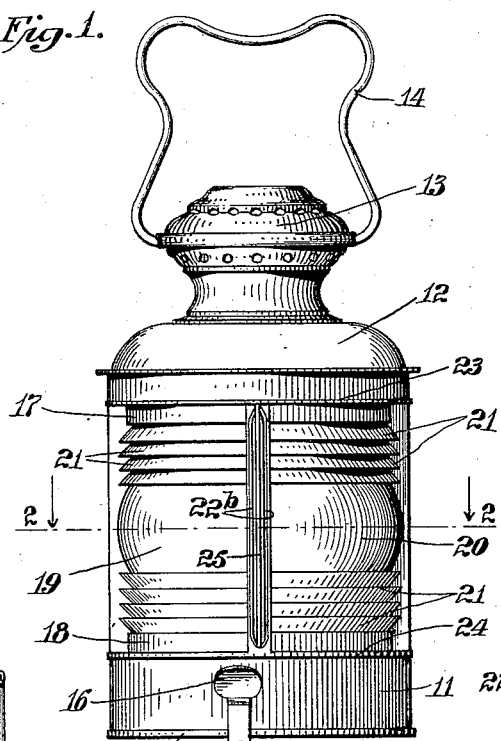
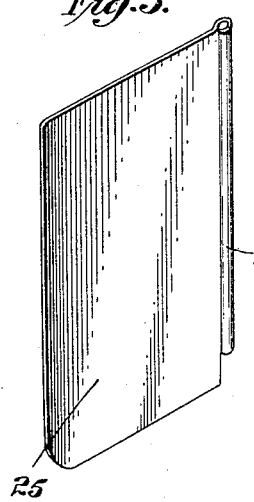
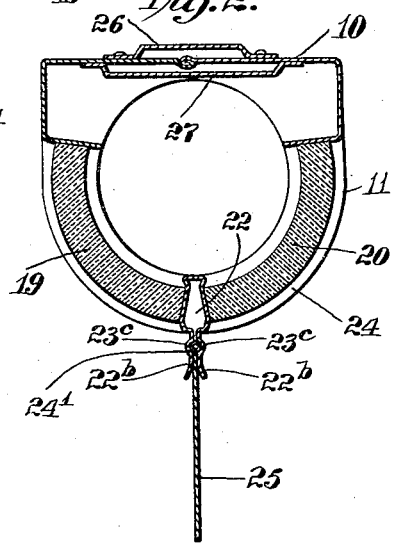
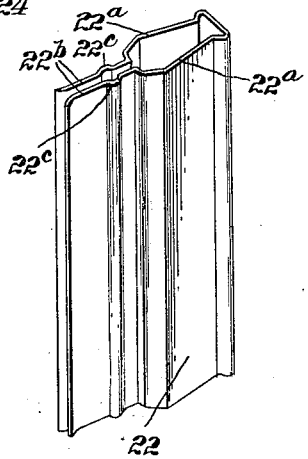
Attest:
by
Inventor:
Frederick Persky
his Atty

UNITED STATES PATENT OFFICE.

FREDERICK PERSKY, OF NEW YORK, N. Y., ASSIGNOR TO NATIONAL MARINE LAMP COMPANY, OF NEW YORK, N. Y., A CORPORATION OF NEW YORK.

LANTERN.

1,057,770. Specification of Letters Patent. Patented Apr. 1, 1913.

Application filed August 31, 1912. Serial No. 718,000.

*To all whom it may concern:*

Be it known that I, FREDERICK PERSKY, a citizen of the United States of America, residing at 52 Elizabeth street, New York city, New York, have invented certain new and useful Improvements in Lanterns, of which the following is a specification.

My invention relates generally to improvements in lanterns and has more specific reference to a type of such lanterns commonly termed "combination lights" in which there are two different colored lenses each formed as a curved segment, having between them a removable screen for the purpose of preventing confusion of lights. In lanterns of this type one of the lenses is generally ruby color to represent the port side of the boat and the other lens is green to represent the starboard side and the screen divides the lenses one from the other, and a craft which may be a few points off from the craft carrying the lantern will not see both lights at once.

The principal object of my invention is to provide a novel form of screen and novel means by which the screen may be removably supported relatively to the lenses. While the lantern is in use the screen as a rule is maintained permanently in position, but when the lantern is removed from the outside of the boat and stowed away the screen is removed so as to economize space.

A further object of the invention is to so improve the general form of such lanterns that the same may contain less material and be more readily and safely secured in position.

Other objects and advantages of the invention and its detail structure will be made clear in the following specification, reference being had to the accompanying drawing, wherein—

Figure 1 is a front elevational view of a lantern embodying my invention; Fig. 2 is a horizontal sectional view on the line 2—2 of Fig. 1; Fig. 3 is a perspective view of the screen adapted to be interposed between the lenses; and Fig. 4 is a similar view of the screen socket prior to its installation in the lantern.

Referring to the drawing it will be noted that the lamp frame consists essentially of the rear upright portion 10, the base 11, dome 12 and perforated head 13 in which the bail 14 is pivotally retained. The base 11 is provided with the swinging or pivoted bottom 15 operable by means of the thumb piece 16. Projecting from the base 11 and dome 12 are oppositely disposed flanges 17 and 18 between which the lenses 19 and 20 are firmly secured in position. As clearly disclosed by the drawing these lenses are preferably formed as curved segments, the lens 19 in actual practice being green to represent starboard and the lens 20 being ruby to represent port, the lenses also being preferably provided with the flutings 21 at each side of the smooth central portion. As shown in Fig. 2, the adjacent faces of the lenses 19 and 20 do not abut but are spaced apart to receive between them the socket designated generally as 22 and illustrated in Fig. 4, this socket at its upper and lower ends resting upon and being held between the projecting parts 23 and 24 of the dome and base respectively. The socket is made of flexible metal and is formed into the substantially parallel walls 22$^a$ which are held between the adjacent faces of the lenses.

Projecting outwardly from the walls 22$^a$ and beyond the outer peripheries of the lenses 19 and 20 are the lateral arms or wings 22$^b$ each of which is formed with a longitudinal depression 23$^c$, which depressions when juxtaposed form a substantially circular opening for the reception of a bead 24$^1$ formed at one edge of the screen 25 which is adapted to be removably supported in the socket 22. The manner in which the screen is positioned in the socket is indicated in Fig. 2, and it will be noted that the outwardly extending wings or arms 22 lie closely adjacent the lateral faces of the screen 25 to prevent the latter from becoming loosened or swaying perceptibly under the action of wind.

One of the features of my invention relates to the form of the lantern itself. Heretofore it has been customary to make these combination lights substantially cylindrical in contour which has necessitated the use of considerable material and also made it rather difficult to secure the lantern in position on the boat. According to my invention that part of the lantern carrying the lenses is made cylindrical, while what may be termed the rear face of the lantern is made flat or substantially so, as indicated at 10, and riveted to the outer face of the wall 10 is a keeper 26 which is adapted to take over a suitable flat hook and thus hold the lantern firmly in position.

The operation of the invention is very simple and will be readily understood from the following description: The bottom 15 is opened, a light inserted in the body of the lantern and the bottom 15 then closed. The rays from the lights will strike the reflector 27 and will be projected through the lenses 19 and 20. When the lantern is in use the screen 25 is inserted in the socket 22 and appears as shown in Figs. 1 and 2. When the lantern is to be placed out of use or packed for shipment, the screen 25 is removed from the socket and placed inside the lantern under the cover so that no more space than is necessary will be taken up by the entire device.

I claim:

1. A lantern of the character specified embodying therein a pair of curved lenses having their adjacent faces spaced apart, and a socket having its body portion held between the adjacent faces of said lenses, said socket having projecting wings adapted to support a screen.

2. A lantern of the character specified embodying therein a lantern frame, a pair of segmental curved lenses supported by said frame with their adjacent faces spaced apart, and a socket fixed between the adjacent faces of the lenses, said socket having projecting wings adapted to support a screen.

3. A lantern of the character specified embodying therein a pair of suitably supported lenses having their adjacent faces spaced apart, and a flexible socket held between said lenses and having projecting wings to removably receive a screen therebetween.

4. A lantern of the character specified embodying therein a pair of curved segmental lenses juxtaposed and having their adjacent faces spaced apart, and a flexible socket having its body portion fixed between the adjacent faces of the lenses and having projecting wings with a slot therebetween, for the reception of a screen.

5. A lantern of the character specified embodying therein a lantern frame including a base and a dome, adjacent lenses supported by the parts of said frame, a socket having its lateral walls held between the adjacent faces of said lenses and its upper and lower edges held between the dome and base respectively, and a screen removably supported by said socket.

6. A lantern of the character specified embodying therein a pair of suitably supported curved lenses having their adjacent faces spaced apart, a flexible socket held between said adjacent faces and having forwardly projecting arms each of which is formed with a substantially semicircular depression, and a screen adapted to be removably supported by said socket, said screen having a bead at one edge thereof adapted to engage the depressions in said arms.

In testimony whereof I have affixed my signature in presence of two witnesses.

FREDERICK PERSKY.

Witnesses:
 EUGENE WENING,
 IRENE BRESSON.

---

Copies of this patent may be obtained for five cents each, by addressing the "Commissioner of Patents, Washington, D. C."